United States Patent [19]

Olson

[11] 4,454,628
[45] Jun. 19, 1984

[54] TABLE FOR USE IN CLEANING FISH
[75] Inventor: Duane G. Olson, Omro, Wis.
[73] Assignee: Boson Table Company, Waukesha, Wis.
[21] Appl. No.: 394,155
[22] Filed: Jul. 1, 1982
[51] Int. Cl.³ .............................................. A22C 25/06
[52] U.S. Cl. .................................................. 17/44; 17/65
[58] Field of Search .................. 17/44, 55, 65, 47, 53; 211/88, 127; 312/115; 269/296

[56] References Cited
U.S. PATENT DOCUMENTS

| | | | |
|---|---|---|---|
| 2,262,767 | 11/1941 | Jeter . | |
| 2,506,532 | 5/1950 | Wilson | 17/44 |
| 2,590,793 | 3/1952 | Rigstad | 211/88 |
| 2,878,945 | 3/1959 | Spier | 211/88 |
| 3,165,779 | 1/1965 | Teetor et al. | 17/65 |
| 3,590,423 | 7/1971 | Messer | 17/55 |

Primary Examiner—Willie G. Abercrombie
Attorney, Agent, or Firm—Nicholas A. Kees

[57] ABSTRACT

A fish-cleaning table for use in the home by attaching it to or suspending it from a sink having a drain and a faucet. The table has a rectangular vacuum-molded body having a higher end and a lower end with a drain opening. A series of slats run lengthwise over the body, supported by crossmembers which rest on notches in the body. The body is held on the sink by short, hook-shaped legs which fold outward from the body, and is supported by legs which pivot downward and contact the sink at a lower point than the hooks. A water spraying system, which connects to the sink's faucet as a source of water, sprays water onto the slats to continuously wash them. This water then washes the debris from cleaning the fish down between the slats and into the drain opening of the body. There a straining means catches the solid particles, and allows the liquid to continue down the drain of the sink. Means for attaching a trash bag for disposal of the larger solid waste items during cleaning and for emptying the straining means afterward is provided at the high end of the body.

7 Claims, 3 Drawing Figures

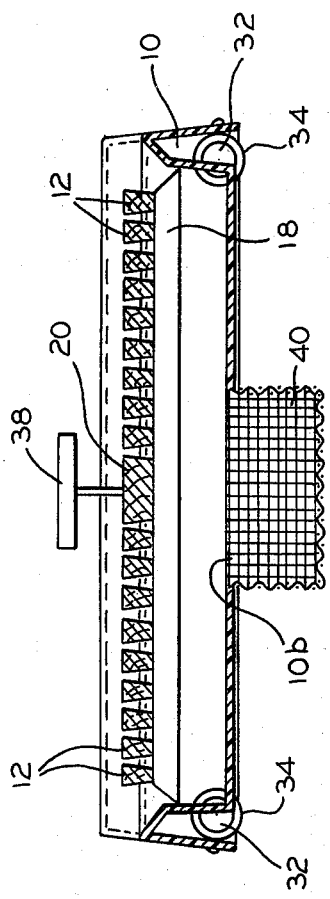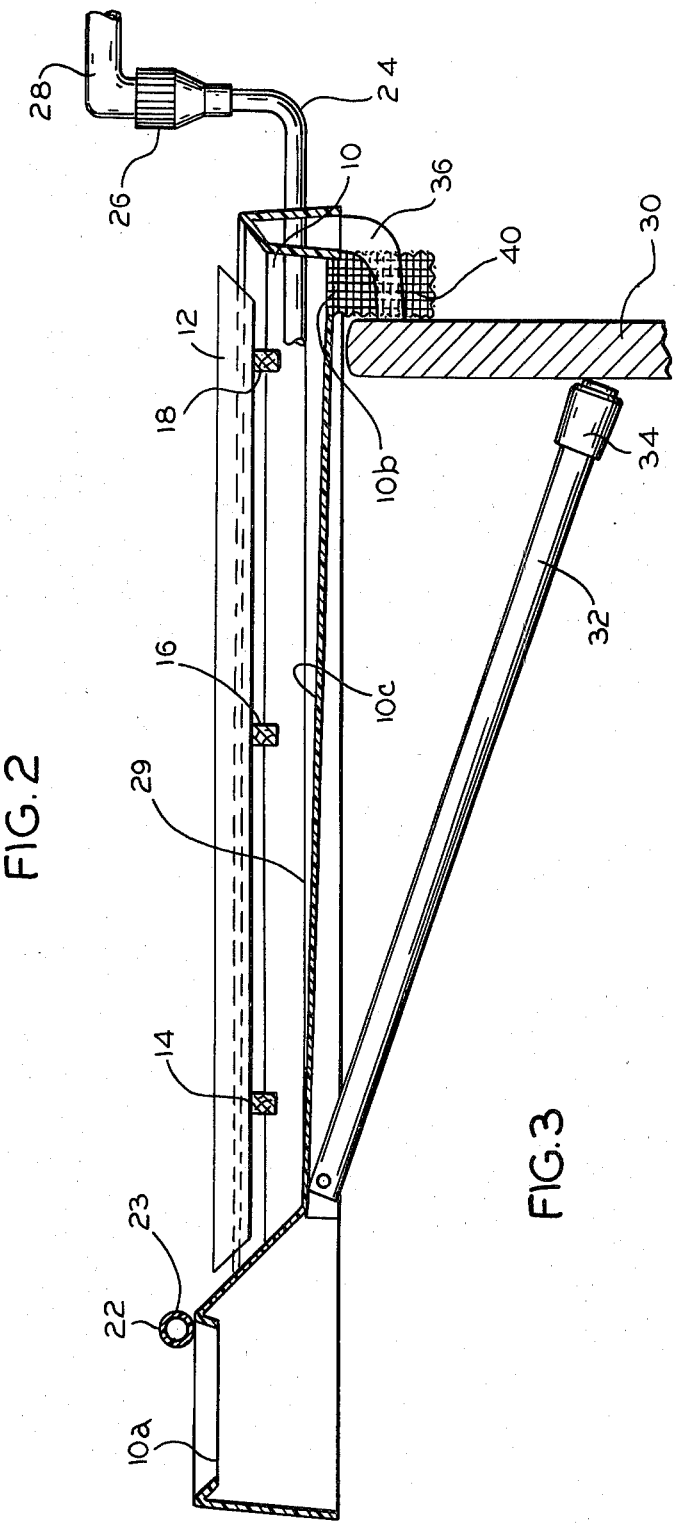

TABLE FOR USE IN CLEANING FISH

BACKGROUND OF THE INVENTION

This invention relates to tables for use in butchering, and in particular to slatted tables for use in cleaning fish, which tables have self-cleaning features.

Previous tables and apparatus in the area of meat cleaning and dressing tables have had certain inadequacies and disadvantages for the individual attempting to use them in his home. For instance, Jeter, U.S. Pat. No. 2,222,767, issued Nov. 18, 1941, is a table cleaning system which employs small jets of water sprayed on the table to keep it clean. It includes, however, a permanent drain system connected to a drain pipe, and so moving it or putting it away between uses would be difficult. Further, since the table itself is solid, the waste material would tend to build up, clogging the screen plate over the drain.

On the other hand, Wilson, U.S. Pat. No. 2,506,352, issued May 2, 1950, shows a system of upper and lower rollers as part of a hog and cattle skinning table. Thus apparently the waste is allowed to drain through to the floor. Since there is no one drain area, the invention disclosed here would be difficult to use in the home.

This invention relates to solutions to the disadvantages of and problems raised by the above inventions.

SUMMARY OF THE INVENTION

The invention includes a rectangular vacuum-molded body portion, having raised side edges, and a floor which is relatively higher at one end and lower at the opposite end. At the higher end, an open loop is attached, having a large opening, from which can be suspended a trash bag or other disposal means. At the center of the lower end of the body portion is a drain opening which empties into a small screened basket for straining the drainage from the cleaning operation. The body rests on a skeletal aluminum frame. Two longer legs are pivotably attached near the higher end of the frame, and are of adjustable length. Two shorter hook-shaped legs are placed on the lower end of the frame under the body, and thus the table can be suspended from a conventional kitchen or basement sink by pivoting the legs downward, and bearing the ends against the outside of the sink. A series of narrow wooden slats, having a wider center board which can be used as a cutting board, extend the length of the body portion, and are supported by crossmembers which fit into notches in the body. A water jet system, which receives its water supply from the faucet of the sink, includes tubing leading from the faucet to a transversely attached tube superposed over the slats at the higher end of the body. Small apertures in the transverse tube allow water to spray onto the slats. This water drains through the slats to the body, down through the drain opening and screened basket into the sink.

An object of the invention is to provide an improved table for use in cleaning fish.

Another object of the invention is to provide a fish-cleaning table which can be easily and quickly attached to and detached from an existing kitchen sink for easy use in the home, and folded away for compact storage.

A more specific object of the invention is to provide a fish-cleaning table having a self-cleaning feature including a water jet system for continuously washing the slats of the table free of any residue.

Another specific object of the invention is to provide a fish cleaning table which can be suspended on the edge of a kitchen or basement sink such that the water can drain into the sink but the solid materials are caught by a straining means which is part of the table.

Other objects and advantages of the invention will become apparent hereinafter.

DESCRIPTION OF THE DRAWINGS

FIG. 2 is a cross-sectional view taken along line 2—2 of FIG. 1.

FIG. 3 is a cross-sectional view taken along line 3—3 of FIG. 1.

DESCRIPTION OF THE PREFERRED EMBODIMENTS

Figure 1:
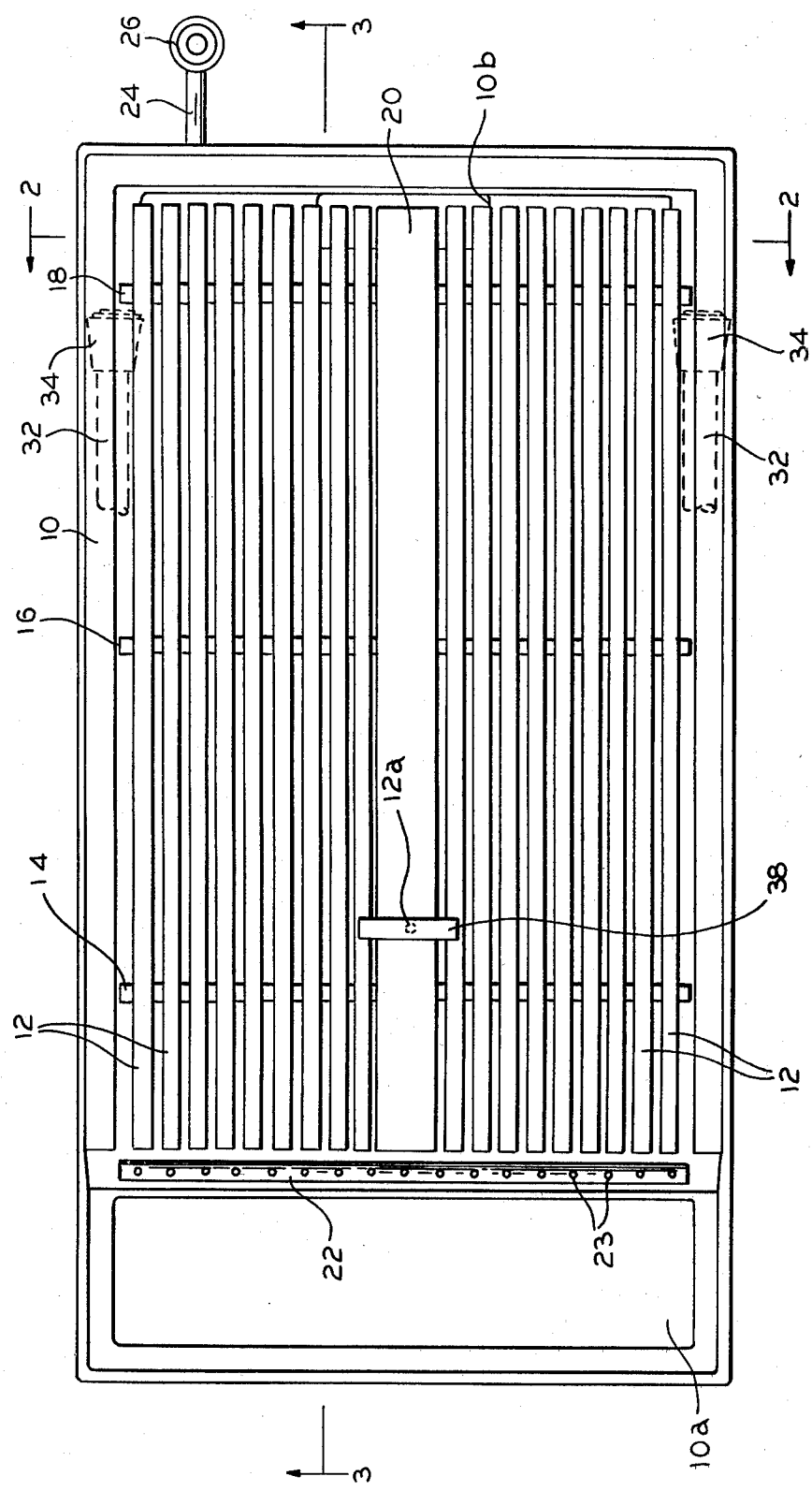
FIG. 1 is a top view of the invention.

Referring to FIG. 1, the fish cleaning table which is the subject of this invention includes an vacuum-molded rectangular plastic body 10 which has a large rectangular opening 10a on one end a small rectangular drain opening 10b on the other end. A series of slats 12 run the length of body 10, and are supported by three crossmembers 14, 16 and 18 which in turn rest in notches molded into body 10. A wider board 20 is provided at the center of slats 12, parallel to and co-planar with the slats, to be used as a cutting board. Board 20 is preferably about five times wider than any single slat.

Referring now also to FIG. 3, at the end of body 10 nearest large opening 10a is a tube 22 which runs horizontally perpendicular to the slats. This tube 22 has a series of apertures 23 spaced along its length, approximately one for each slat 12. Tube 22 is connected, by means of tubing 24 and coupler 26, to a conventional sink faucet 28.

Body 10 rests on a skeletal aluminum frame 29. In order to suspend the table from a sink 30 so that faucet 28 is accessible, pivotable legs 32 are connected to the frame 29, one on each side, as shown in FIG. 2. The length of these legs 32 is adjustable by any suitable means, preferably snap means, so that different sink arrangements can be accommodated. Bumpers 34 are slid onto the ends of legs 32 to avoid marring the outside surfaces of sink 30. Two shorter hook-shaped legs 36, shown in FIG. 3, are pivotably connected to the frame 29 at the opposite end. The pivot axes 37 of short legs 36 are placed longitudinally in the body 10, such that each such leg can open outward and down, as shown in FIG. 3, or fold inward and up. When in the downward position, short legs 36 contact the inside of sink 30, while legs 32 contact the outside of the sink 30 at a substantially lower point. The weight of the table is thus supported by sink 30 via legs 32, short legs 36 and the frame 29.

The inside floor 10c of body 10 is shown best in section in FIG. 3. The highest point of floor 10c is directly beneath tube 22, at the left end as viewed in FIG. 3. From there floor 10c slopes sharply downward to a point just below the left end of the slats 12, and then turns substantially flatter to a point over the attachment pivot of legs 32. From that point the slope is very gentle towards drain opening 10b on the opposite end.

In operation, as shown in FIG. 3, the table is hooked onto and suspended from sink 30 via legs 32 and short legs 36. Coupler 26 is then connected to faucet 28, and the water is turned on. The water is carried via tubing 24 to spray tube 22, and is jetted out onto slats 12 through holes 23 in tube 22. A conventional plastic trash bag (not shown) is attached to large opening 10a, and allowed to hang down through this opening, for disposal of the solid waste material (bones, etc.) during the cleaning process. The operator then spikes the fish (not shown) to be cleaned onto the slats by means of a spike 38, shown in FIGS. 1 and 2, and aperture 12a, shown in FIG. 1, and begins cleaning the fish. While he is doing so, the water from tube 22 is constantly being sprayed onto slats 12, and washing them clean of the normal slime, blood and residue resulting from the cleaning of fish. The water and everything washed along by it flow into drain opening 10b, and into a removable straining means 40, shown in FIGS. 2 and 3. There the liquid waste is allowed to pass through and into the drain of sink 30, while the solid waste is retained there to be emptied into the trash bag attached to opening 10a at the close of the fish cleaning operation.

While the apparatus hereinbefore described is effectively adapted to fulfill the aforesaid objects, it is to be understood that the invention is not intended to be confined to the particular preferred embodiments of fish-cleaning table herein set forth inasmuch as they are susceptible of various modifications without departing from the scope of the appended claims.

What is claimed is:

1. A table for cleaning fish, and for connection to a sink having a faucet and a drain, comprising:
    a rectangular body, the floor on the inside of which slopes downward from a higher end to a lower end, and having a drain opening at the lower end;
    means for attaching said body to the sink such that the drain opening is positioned over the sink;
    a plurality of slats suspended lengthwise above the floor of said body, by resting on crossmembers which in turn rest on said body; and
    means for spraying water onto said slats,
    such that when the fish is cleaned on said slats, the waste material drains down between said slats and into the drain opening of said body, and the slats are continuously washed by the water from said spraying means.

2. A table for cleaning fish as recited in claim 1 further comprising means, connected to the higher end of said body, for attaching disposable retaining means for retaining the solid waste parts of the fish until disposal.

3. A table for cleaning fish as recited in claim 2 further comprising straining means attached to said body directly below the drain opening, such that only the liquid waste from the fish, mixed with the water, is allowed to run into the sink drain, while the solid waste material which does drain down between said slats is caught for disposal.

4. A table for cleaning fish as recited in claim 3 further comprising means for folding the fish on the slats.

5. A table for cleaning fish as recited in claim 4 wherein said means for attaching said body to the sink includes a plurality of short hook-shaped legs pivotably connected to the underside of the body at the end nearest the drain opening, which hook on the inside of the sink, and at least one leg, pivotably attached to said body near the opposite end, for contacting the outside of the sink and supporting the weight of the table.

6. A table for cleaning fish as recited in claim 5 wherein the length of said pivotable leg can be adjusted by snap means, such that various sizes and types of sinks can be accommodated.

7. A table for cleaning fish as recited in claim 6 wherein said water spraying means include a tube nearest the higher end of said body, above said slats, running perpendicular to said slats, having apertures along its side facing toward said slats, approximately one aperture per slat, and having means to connect it to the faucet of the sink as a source of water,
    such that water from the faucet fills said tube and sprays out onto said slats via said apertures, continuously washing said slats free of debris and waste.

* * * * *

UNITED STATES PATENT AND TRADEMARK OFFICE
CERTIFICATE OF CORRECTION

PATENT NO. : 4,454,628
DATED : JUNE 19, 1984
INVENTOR(S) : DUANE G. OLSON

It is certified that error appears in the above-identified patent and that said Letters Patent are hereby corrected as shown below:

At Column 4, line 15, word "folding" should read --holding--

Signed and Sealed this

Twenty-third Day of October 1984

[SEAL]

Attest:

Attesting Officer

GERALD J. MOSSINGHOFF

Commissioner of Patents and Trademarks